United States Patent
Goyal et al.

(10) Patent No.: US 7,143,024 B1
(45) Date of Patent: Nov. 28, 2006

(54) ASSOCIATING IDENTIFIERS WITH VIRTUAL PROCESSES

(75) Inventors: Pawan Goyal, Mountain View, CA (US); Snorri Gylfason, Mountain View, CA (US); Xun Wilson Huang, Mountain View, CA (US); Srinivasan Keshav, Mountain View, CA (US); Rosen Sharma, Mountain View, CA (US)

(73) Assignee: Ensim Corporation, Sunnyvale, CA (US)

( * ) Notice: Subject to any disclaimer, the term of this patent is extended or adjusted under 35 U.S.C. 154(b) by 613 days.

(21) Appl. No.: 09/611,877

(22) Filed: Jul. 7, 2000

(51) Int. Cl.
*G06F 13/24* (2006.01)
*G06F 9/46* (2006.01)
*G06F 9/44* (2006.01)
*G06F 13/10* (2006.01)
*G06F 13/12* (2006.01)

(52) U.S. Cl. ............. 703/21; 710/260; 718/100; 718/101

(58) Field of Classification Search ........... 703/21; 364/200; 395/200, 800, 400; 717/163, 5, 717/10; 709/315, 331, 332; 700/21; 370/389; 713/2, 200; 710/260; 718/101, 100
See application file for complete search history.

(56) References Cited

U.S. PATENT DOCUMENTS

| | | | |
|---|---|---|---|
| 3,377,624 A | 4/1968 | Nelson et al. | |
| 4,177,510 A | 12/1979 | Appell et al. | 364/200 |
| 5,189,667 A | 2/1993 | Esaki et al. | |
| 5,212,793 A | 5/1993 | Donica et al. | |
| 5,226,160 A | 7/1993 | Waldron et al. | |
| 5,249,290 A | 9/1993 | Heizer | |
| 5,263,147 A | 11/1993 | Francisco et al. | 395/425 |
| 5,325,530 A | 6/1994 | Mohrmann | |
| 5,437,032 A | 7/1995 | Wolf et al. | |
| 5,528,753 A | 6/1996 | Fortin | |
| 5,566,334 A * | 10/1996 | Loader | 718/100 |
| 5,572,680 A * | 11/1996 | Ikeda et al. | 709/243 |
| 5,584,023 A | 12/1996 | Hsu | |
| 5,603,020 A | 2/1997 | Hashimoto et al. | 395/616 |
| 5,615,400 A * | 3/1997 | Cowsar et al. | 719/332 |
| 5,623,492 A | 4/1997 | Teraslinna | |
| 5,636,371 A | 6/1997 | Yu | 395/500 |
| 5,640,595 A | 6/1997 | Baugher et al. | |

(Continued)

FOREIGN PATENT DOCUMENTS

JP 64-002145 1/1989

(Continued)

OTHER PUBLICATIONS

Debasis Mitra et al. Hierarchical Virtual Partitioning- Algorithms for Virtual Private Networking, Bell Labs Technical Journal, Spring, 1997, http://cm.bell-labs.com/cm/ms/who/mitra/papers/globe.ps.*

(Continued)

*Primary Examiner*—Anthony Knight
*Assistant Examiner*—Sunray Chang
(74) *Attorney, Agent, or Firm*—Fenwick & West LLP (57) ABSTRACT

Multiple virtual processes are each associated with a unique virtual process identifier. For each virtual process, a separate initialization process is started, from which all other processes included in the virtual process originate. The initialization process is associated with the appropriate virtual process identifier. System calls that create new processes are intercepted, and created processes are associated with the virtual process identifier of the appropriate initialization process. Multiple virtual processes are provided on a single, physical computer system.

25 Claims, 3 Drawing Sheets

U.S. PATENT DOCUMENTS

| | | | |
|---|---|---|---|
| 5,692,047 A | 11/1997 | McManis | 380/4 |
| 5,706,097 A | 1/1998 | Schelling et al. | 358/296 |
| 5,706,453 A | 1/1998 | Cheng et al. | |
| 5,708,774 A | 1/1998 | Boden | |
| 5,719,854 A | 2/1998 | Choudhury et al. | |
| 5,727,147 A * | 3/1998 | van Hoff | 709/200 |
| 5,727,203 A * | 3/1998 | Hapner et al. | 707/103 R |
| 5,748,614 A | 5/1998 | Wallmeier | |
| 5,752,003 A | 5/1998 | Hart | |
| 5,761,477 A | 6/1998 | Wahbe et al. | 395/406 A |
| 5,764,889 A | 6/1998 | Ault et al. | |
| 5,781,550 A | 7/1998 | Templin et al. | 370/401 |
| 5,799,173 A | 8/1998 | Gossler et al. | |
| 5,809,527 A | 9/1998 | Cooper et al. | 711/133 |
| 5,828,893 A | 10/1998 | Weid et al. | 395/800 |
| 5,838,686 A | 11/1998 | Ozkan | |
| 5,838,916 A | 11/1998 | Domenikos et al. | 395/200.49 |
| 5,842,002 A | 11/1998 | Schnurer et al. | 395/500 |
| 5,845,129 A | 12/1998 | Wendorf et al. | 395/726 |
| 5,850,399 A | 12/1998 | Ganmukhi et al. | |
| 5,860,004 A | 1/1999 | Fowlow et al. | |
| 5,864,683 A * | 1/1999 | Boebert et al. | 709/249 |
| 5,889,956 A | 3/1999 | Hauser et al. | |
| 5,889,996 A * | 3/1999 | Adams | 717/139 |
| 5,892,968 A | 4/1999 | Iwasaki et al. | |
| 5,905,730 A | 5/1999 | Yang et al. | |
| 5,905,859 A | 5/1999 | Holloway et al. | |
| 5,913,024 A | 6/1999 | Green et al. | 395/186 |
| 5,915,085 A | 6/1999 | Koved | 395/186 |
| 5,915,095 A | 6/1999 | Miskowiec | |
| 5,918,018 A | 6/1999 | Gooderum et al. | 395/200.55 |
| 5,920,699 A | 7/1999 | Bare | |
| 5,933,603 A | 8/1999 | Vahalia et al. | |
| 5,937,159 A | 8/1999 | Meyers et al. | 395/187.01 |
| 5,956,481 A | 9/1999 | Walsh et al. | 395/186 |
| 5,961,582 A | 10/1999 | Gaines | |
| 5,978,373 A | 11/1999 | Hoff et al. | |
| 5,982,748 A | 11/1999 | Yin et al. | |
| 5,987,242 A * | 11/1999 | Bentley et al. | 703/13 |
| 5,987,524 A | 11/1999 | Yoshida et al. | |
| 5,987,608 A * | 11/1999 | Roskind | 726/14 |
| 5,991,812 A | 11/1999 | Srinivasan | |
| 5,999,963 A | 12/1999 | Bruno et al. | |
| 6,016,318 A | 1/2000 | Tomoike | |
| 6,018,527 A | 1/2000 | Yin et al. | |
| 6,023,721 A | 2/2000 | Cummings | 709/201 |
| 6,038,608 A | 3/2000 | Katsumanta | |
| 6,038,609 A | 3/2000 | Geulen | |
| 6,047,325 A | 4/2000 | Jain et al. | |
| 6,055,617 A | 4/2000 | Kingsbury | |
| 6,055,637 A | 4/2000 | Hudson et al. | |
| 6,061,349 A * | 5/2000 | Coile et al. | 370/389 |
| 6,065,118 A | 5/2000 | Bull et al. | 713/200 |
| 6,075,791 A | 6/2000 | Chiussi et al. | |
| 6,075,938 A | 6/2000 | Bugnion et al. | 395/500.48 |
| 6,078,929 A | 6/2000 | Rao | |
| 6,078,957 A | 6/2000 | Adelman et al. | |
| 6,086,623 A | 7/2000 | Broome et al. | |
| 6,092,178 A | 7/2000 | Jindal et al. | |
| 6,094,674 A | 7/2000 | Hattori et al. | |
| 6,101,543 A | 8/2000 | Alden et al. | |
| 6,108,701 A | 8/2000 | Davis et al. | |
| 6,108,759 A | 8/2000 | Orcutt et al. | 711/173 |
| 6,122,673 A | 9/2000 | Basak et al. | |
| 6,154,776 A | 11/2000 | Martin | |
| 6,154,778 A | 11/2000 | Koistinen et al. | |
| 6,161,139 A | 12/2000 | Win et al. | |
| 6,167,520 A | 12/2000 | Touboul | 713/200 |
| 6,172,981 B1 | 1/2001 | Cox et al. | |
| 6,189,046 B1 * | 2/2001 | Moore et al. | 719/315 |
| 6,192,389 B1 * | 2/2001 | Ault et al. | 718/101 |
| 6,192,512 B1 | 2/2001 | Chess | 717/5 |
| 6,230,203 B1 | 5/2001 | Koperda et al. | |
| 6,240,463 B1 | 5/2001 | Benmohamed et al. | |
| 6,247,057 B1 | 6/2001 | Barrera | |
| 6,247,068 B1 | 6/2001 | Kyle | |
| 6,259,699 B1 | 7/2001 | Opalka et al. | |
| 6,266,678 B1 | 7/2001 | McDevitt et al. | |
| 6,269,404 B1 | 7/2001 | Hart et al. | |
| 6,279,039 B1 | 8/2001 | Bhat et al. | |
| 6,279,040 B1 | 8/2001 | Ma et al. | |
| 6,282,581 B1 | 8/2001 | Moore et al. | |
| 6,282,703 B1 * | 8/2001 | Meth et al. | 717/163 |
| 6,286,047 B1 | 9/2001 | Ramanathan et al. | |
| 6,298,479 B1 | 10/2001 | Chessin et al. | |
| 6,314,558 B1 | 11/2001 | Angel et al. | |
| 6,327,622 B1 | 12/2001 | Jindal et al. | |
| 6,336,138 B1 | 1/2002 | Caswell et al. | |
| 6,351,775 B1 | 2/2002 | Yu | |
| 6,353,616 B1 | 3/2002 | Elwalid et al. | |
| 6,363,053 B1 | 3/2002 | Schuster et al. | |
| 6,366,958 B1 | 4/2002 | Ainsworth et al. | |
| 6,370,583 B1 | 4/2002 | Fishler et al. | |
| 6,374,292 B1 | 4/2002 | Srivastava et al. | |
| 6,381,228 B1 | 4/2002 | Prieto, Jr. et al. | |
| 6,385,638 B1 | 5/2002 | Baker-Harvey | |
| 6,385,722 B1 * | 5/2002 | Connelly et al. | 713/2 |
| 6,389,448 B1 | 5/2002 | Primak et al. | |
| 6,393,484 B1 | 5/2002 | Massarani | |
| 6,425,003 B1 | 7/2002 | Herzog et al. | |
| 6,430,622 B1 | 8/2002 | Aiken, Jr. et al. | |
| 6,434,631 B1 | 8/2002 | Bruno et al. | |
| 6,434,742 B1 | 8/2002 | Koepele, Jr. | |
| 6,438,134 B1 | 8/2002 | Chow et al. | |
| 6,442,164 B1 | 8/2002 | Wu | |
| 6,449,652 B1 | 9/2002 | Blumenau et al. | |
| 6,457,008 B1 | 9/2002 | Rhee et al. | |
| 6,463,459 B1 | 10/2002 | Orr et al. | |
| 6,470,398 B1 | 10/2002 | Zargham et al. | |
| 6,484,173 B1 | 11/2002 | O'Hare et al. | |
| 6,487,578 B1 | 11/2002 | Ranganathan | |
| 6,487,663 B1 | 11/2002 | Jaisimha et al. | |
| 6,490,670 B1 | 12/2002 | Collins et al. | |
| 6,496,847 B1 | 12/2002 | Bugnion et al. | |
| 6,499,137 B1 | 12/2002 | Hunt | |
| 6,529,950 B1 | 3/2003 | Lumelsky et al. | |
| 6,529,985 B1 * | 3/2003 | Deianov et al. | 710/260 |
| 6,542,167 B1 | 4/2003 | Darlet et al. | |
| 6,553,413 B1 | 4/2003 | Leighton et al. | |
| 6,578,055 B1 | 6/2003 | Hutchison et al. | |
| 6,578,068 B1 | 6/2003 | Bowman-Amuah | |
| 6,580,721 B1 | 6/2003 | Beshai | |
| 6,590,588 B1 | 7/2003 | Lincke et al. | |
| 6,622,159 B1 | 9/2003 | Chao et al. | |
| 6,647,422 B1 | 11/2003 | Wesinger et al. | |
| 6,658,571 B1 | 12/2003 | O'Brien et al. | |
| 6,691,312 B1 | 2/2004 | Sen et al. | |
| 6,725,456 B1 | 4/2004 | Bruno et al. | |
| 6,760,775 B1 | 7/2004 | Anerousis et al. | |
| 6,785,728 B1 | 8/2004 | Schneider et al. | |
| 6,820,117 B1 | 11/2004 | Johnson | |
| 6,859,835 B1 | 2/2005 | Hipp | |
| 6,912,590 B1 | 6/2005 | Lundback et al. | |
| 2003/0061338 A1 | 3/2003 | Stelliga | |

FOREIGN PATENT DOCUMENTS

| | | |
|---|---|---|
| WO | WO 99/39261 | 8/1999 |

OTHER PUBLICATIONS

Goyal, P. et al., "Start-time Fair Queuing: A Scheduling Algorithm for Integrated Services Packet Switching Networks," Proceedings of ACM SIGCOMM '96, San Francisco, CA, Aug. 1996, 14 pages.

Jánosi, T., "Notes on 'A Hierarchical CPU Scheduler for Multimedia Operating Systems' by Pawan Goyal, Xingang Guo and Harrick Vin," [online], [retrieved on May 8, 2000]. Retrieved from the internet: <URL: http://cs.cornell.edu/Info/Courses/Spring-97/CS614/goy.html>.

Goyal, P., "Packet Scheduling Algorithms for Integrated Services Networks," PhD Dissertation, University of Texas, Austin, TX, Aug. 1997.

Pending United States patent application entitled "Providing Quality of Service Guarantees to Virtual Hosts," U.S. Appl. No. 09/452,286, filed Nov. 30, 1999.

Pending United States patent application entitled "Selective Interception of System Calls," U.S. Appl. No. 09/499,098, filed Feb. 4, 2000.

Pending United States patent application entitled "Dynamic Scheduling of Task Streams in a Multiple-Resource System to Ensure Task Stream Quality of Service," U.S. Appl. No. 09/498,450, filed Feb. 4, 2000.

Pending United States patent application entitled "Disambiguating File Descriptors," U.S. Appl. No. 09/500,212, filed Feb. 8, 2000.

Pending United States patent application entitled "Restricting Communication Between Network Devices on a Common Network," U.S. Appl. No. 09/502,155, filed Feb. 11, 2000.

Pending United States patent application entitled "Restricting Communication of Selected Processes to a Set of Specific Network Addresses," U.S. Appl. No. 09/503,975, filed Feb. 14, 2000.

Pending United States patent application entitled "Enabling a Service Provider to Provide Intranet Services," U.S. Appl. No. 09/526,980, filed Mar. 15, 2000.

Pending United States patent application entitled "Dynamically Modifying the Resources of a Virtual Server," U.S. Appl. No. 09/569,371, filed May 11, 2000.

Pending United States patent application entitled "Regulating File Access Rates According to File Type," U.S. Appl. No. 09/572,672, filed May 16, 2000.

Pending United States patent application entitled "Modifying Internal Components of a Running Operating System," U.S. Appl. No. 09/576,393, filed May 22, 2000.

Boehm, B., "Managing Software Productivity and Reuse," IEEE Computer, vol. 32, No. 9, Sep. 1999, 3 pages.

Corbato, F. J. et al. "An Experimental Timesharing System," Proceedings of the American Federation Of Information Processing Societies Spring Joint Computer Conference, San Francisco, CA, May 1-3, 1962, pp. 335-344.

Deutsch, P. and Grant, C.A., "A Flexible Measurement Tool for Software Systems," Information Processing 71 (Proc. of the IFIP Congress), 1971, pp. 320-326.

Edjlali, G., et al., "History-based Access Control for Mobile Code," Fifth ACM Conference on Computer and Communication Security, Nov. 3-5, 1998, 19 pages.

Erlingsson, U. and Schneider, F. B., "SASI Enforcement of Security Policies: A Retrospective," Proc. New Security Paradigms Workshop, Apr. 2, 1999, pp. 1-17.

Erlingsson, U. and Schnieder, F. B., IRM Enforcement of Java Stack Inspection, [online], Feb. 19, 2000, [retrieved on Apr. 2, 2002]. Retrieved from the Internet: <URL: http://cs-tr.cs.cornell.edu/Dienst/UI2.0/Show Page/ncstrl.cornell/TR2000-1786>.

Evans, D. and Twyman, A., "Flexible Policy-Directed Code Safety," Proc. of 1999 IEEE Symposium on Security and Privacy, Oakland, CA, May 9-12, 1999, pp. 1-14.

Fraser, T. et al., "Hardening COTS Software with Generic Software Wrappers," Proc. of 1999 IEEE Symposium on Security and Privacy, 1999, 15 pages.

Goldberg, I. et al., "A Secure Environment For Untrusted Helper Applications (Confining the Wily Hacker)," Proc. of the Sixth USENIX UNIX Security Symposium, San Jose, CA, Jul. 1996, 14 pages.

Goldberg, R. P., "Survey of Virtual Machine Research," IEEE Computer, Jun. 1974, pp. 34-45.

Pandey, R. and Hashii, B., "Providing Fine-Grained Access Control For Mobile Programs Through Binary Editing," Technical Report TR98 08, University of California, Davis, CA, 1998, pp. 1-22.

Ritchie, D. M., "The Evolution of the Unix Time-Sharing System," AT&T Bell Laboratories Technical Journal 63, No. 6, Part 2, Oct. 1984, (originally presented 1979), 11 pages.

Saltzer, J., H. and Schroeder, M. D., The Protection of Information in Computer Systems, [online], 1973, [retrieved on Apr. 2, 2002]. Retrieved from the Internet: <URL: http://www.cs.virginia.edu~evans/cs551/saltzer/>.

Wahbe, R., et al., "Efficient Software-Based Fault Isolation," Proc. of the Symposium on Operating System Principles, 1993, 14 pages.

Goyal, Pawan et al., *Generalized Guaranteed Rate Scheduling Algorithms: A Framework*, IEEE/ACM Transactions, vol. 5, Issue: 4, Aug. 1997; pp. 561-571.

Symbol Table, [online] copyright 1997, 1998, [Retrieved on Apr. 4, 2003] Retrieved from the internet < URL: http://216.239.33.100/search?q=cache:eASXk8qC_-AC:www.caldera.com/developers/gabi/1998-04-29/ch4.2...], pp. 1-5.

Plummer, D. C., *An Ethernet Address Resolution Protocol—or—Converting Network Protocol Addresses to 48.bit Ethernet Address for Transmission on Ethernet Hardware*, Nov. 1982, [online], [retrieved on Jan. 17, 2000]. Retrieved from the Internet: <URL: http://www.msg.net/kadow/answers/extras/rfc/rfc826.txt>.

Huang, X. W. et al., "The ENTRAPID Protocol Development Environment," *Proceedings of IEEE Infocom'99*, Mar. 1999, nine pages.

Duffield, N.G., et al., "A Flexible Model for Resource Management in Virtual Private Networks," *Computer Communication Review Conference, Computer Communication*, ACM SIGCOMM '99 Conference, Cambridge, MA, Aug. 30, 1999-Sep. 3, 1999. pp. 95-108.

Campbell, A. T. and Keshav, S., "Quality of Service in Distributed Systems," *Computer Communications 21*, 1998, pp. 291-293.

Bach, M. J., *The Design of the Unix® Operating System*, New Delhi, Prentice-Hall of India, 1989, pp. v-x, 19-37.

McDougall, R., et al., *Resource Management*, Upper Saddle River, NJ, Prentice Hall, 1999, pp. iii-xix, 135-191.

Rijsinghani, A., RFC 1624, May 1994, [online], [retrieved Feb. 2, 2000]. retrieved from the internet: <URL: http://www.faqs.org/rfcs/rfc1624.html>.

Mallory, T and Kullberg, A., RFC 1141, Jan. 1990 [online], [retrieved Feb. 2, 2000]. retrieved from the Internet: <URL: http://www.faqs.org/rfcs/rfc1141.html>.

Egevang, K. and Francis P., RFC 1631, May 1994 [online], [retrieved Feb. 2, 2000]. retrieved from the Internet: <URL: http://www.faqs.org/rfcs/rfc1631.html>.

Keshav, S., *An Engineering Approach to Computer Networking: ATM Networks, the Internet, and the Telephone Network*, Reading, MA, Addison-Wesley, 1997, pp. vii-xi, 85-115, 209-355, 395-444.

Stevens, R. W., *UNIX Network Programming vol. 1 Networking APIs: Sockets and XTI*, Upper Saddle River, NJ, Prentice Hall, 1998, pp. v-xiv, 29-53, 85-110, 727-760.

Tanenbaum, A. S. and Woodhull, A. S., *Operating Systems: Design and Implementation*, Upper Saddle River, NJ, Prentice Hall, 1997, pp. vii-xiv, 1-46, 401-454.

Rubini, A., *LINUX Device Drivers*, Sebastopol, CA, O'Reilly & Associates, Inc., 1998, pp. v-x, 13-40.

Goyal, P., et al., "A Hierarchical CPU Scheduler for Multimedia Operating Systems," *Proceedings of the Second Symposium on Operating Systems Design and Implementations (OSDI'96)*, Seattle, WA, Oct. 1996, 15 pages.

Laurie, B. and Laurie, P., *Apache The Definitive Guide*, Sebastopol, CA, O'Reilly & Associates, Inc., Feb. 1999, pp. v-viii, 43-74.

Aho, A. V. and Ullman J. D., *Principles of Complier Design*, Reading, MA, 1977, pp. vii-x, 359-362, 519-522.

Jonsson, J., "Exploring the Importance of Preprocessing Operations in Real-Time Multiprocessor Scheduling," *Proc. of the IEEE Real-Time Systems Symposium—Work-in-Progress session*, San Francisco, CA, Dec. 4, 1997, pp. 31-34.

Rusling, D. A., Processes, [online], [retrieved on Dec. 7, 1999]. Retrieved from the Internet: <URL: http://www.cebaf.gov/~saw/linux/tlk-html/node44.html>.

Rusling, D. A., Linux Processes, [online], [retrieved on Dec. 7, 1999]. Retrieved from the Internet: <URL: http://www.cebaf.gov/~saw/linux/tlk-html/node45.html>.

Rusling, D. A., Identifiers, [online], [retrieved on Dec. 7, 1999]. Retrieved from the Internet: <URL: http://www.cebaf.gov/~saw/linux/tlk-html/node46.html>.

Rusling, D. A., Scheduling, [online], [retrieved on Dec. 7, 1999]. Retrieved from the Internet: <URL: http://www.cebaf.gov/~saw/linux/tlk-html/node47.html>.

Rusling, D. A., Scheduling in Multiprocessor Systems, [online], [retrieved on Dec. 7, 1999]. Retrieved from the Internet: <URL: http://www.cebaf.gov/~saw/linux/tlk-html/node48.html>.

Rusling, D. A., Files, [online], [retrieved on Dec. 7, 1999]. Retrieved from the Internet: <URL: http://www.cebaf.gov/~saw/linux/tlk-html/node49.html>.

Berkeley Software Distribution, "man page: setpgid", Feb. 1, 1994, [Retrieved on Oct. 13, 2005], Retrieved from the Internet <URL: http://www.neosoft.com/neosoft/man/setpgid.2.html>.

Berkeley Software Distribution, "man page: setsid", Feb. 1, 1994, [Retrieved on Oct. 13, 2005], Retrieved from the Internet <URL: http://www.neosoft.com/neosoft/man/setsid.2.html>.

Frost, J., "UNIX Signals and Process Groups", Aug. 17, 1994, [Retrieved on Oct. 13, 2005], Retrieved from the Internet <URL: http://www.cs.ucsb.edu/~almeroth/classes/W99.276/assignment1/signals.html>.

Stevens, Richard W., "Advanced Programming in the UNIX® Environment", 1993, pp. 237-246, 282-285, Addison Wesley Longman, Inc., USA.

* cited by examiner

ASSOCIATING IDENTIFIERS WITH VIRTUAL PROCESSES

BACKGROUND

1. Field of Invention

The present invention relates generally to virtual computer processes, and specifically to associating an identifier with each of a plurality of processes comprising a virtual process.

2. Background of Invention

With the popularity and success of the Internet, server technologies are of great commercial importance today. Typically, an individual server application executes on a single physical host computer, servicing client requests. However, providing a unique physical host for each server application is expensive and inefficient. Hosting services are often provided commercially by an Internet Service Provider (ISP). Typically, an ISP has to provide a separate physical host computer on which to execute a server application for every customer that purchases hosting services. Often, a customer purchasing hosting services from an ISP will neither require nor be amenable to paying for use of an entire host computer. Generally, only a fraction of the processing power, storage, and other resources of a host computer will be required to meet the needs of an individual customer.

It is desirable for an ISP to be able to provide multiple server applications on a single physical host computer. However, in order to be commercially viable, every server application would have to be isolated from every other server application running on the same physical host. Obviously, it would be unacceptable to customers of an ISP to purchase hosting services, only to have another server application program (perhaps belonging to a competitor) be able to access the customer's data and client requests. Thus, each server application program would have to be isolated, receiving requests from only its own clients, transmitting data to only its own clients, and being prevented from accessing data associated with other server applications. Furthermore, it would be necessary to allocate varying specific levels of system resources to different server applications, depending upon the needs of and amounts paid by the various customers of the ISP. In effect, each server application would need to comprise a virtual private server, simulating a server application executing on a dedicated physical host computer.

Such functionality has been heretofore impossible because a virtual private server, rather than comprising a single, discrete process, must be made up of a plurality of seemingly unrelated processes, each performing various elements of the sum total of the functionality required by the customer. Because each virtual private server must comprise a plurality of processes, it has been impossible for an ISP to isolate the processes associated with one virtual private server from those processes associated with other virtual private servers. What is needed is a method whereby the individual ones of pluralities of separate processes comprising multiple, virtual private servers can each be associated with their respective virtual private server.

SUMMARY OF INVENTION

The present invention facilitates the association of multiple processes with their respective virtual private servers. In order to run multiple virtual processes on a single, physical computer system, each virtual private server is started by executing a separate, system initialization process. Each system initialization process is associated with a virtual private server identifier, for example by storing the identification number of the process and the virtual private server identifier in a data structure in computer memory. Each virtual private server identifier may be associated with a particular customer to identify the virtual private server belonging to the customer.

System calls that create processes are intercepted, and a system call wrapper associates created processes with the virtual private server identifier with which the process that made the system call is associated. Thus, all processes originating from each system initialization process will be associated with the virtual private server identifier associated with the corresponding system initialization process. Because all processes that are part of a virtual private server will be created by the associated system initialization process or by its progeny, all processes comprising a virtual private server will be associated with the corresponding virtual private server identifier. This allows all processes that are a part of each customer's virtual private server to be identified and segregated from the processes of other customers, even though these processes are executing on the same physical server.

It will be readily apparent to one skilled in the art that the present invention can be utilized to associate a plurality of processes comprising any type of virtual process with a corresponding virtual process identifier. Of course, all such utilizations are within the scope of the present invention. Although in one embodiment, the virtual process is in the form of a virtual private server, the present invention is by no means limited to this embodiment.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

I. System Overview

Figure 1:
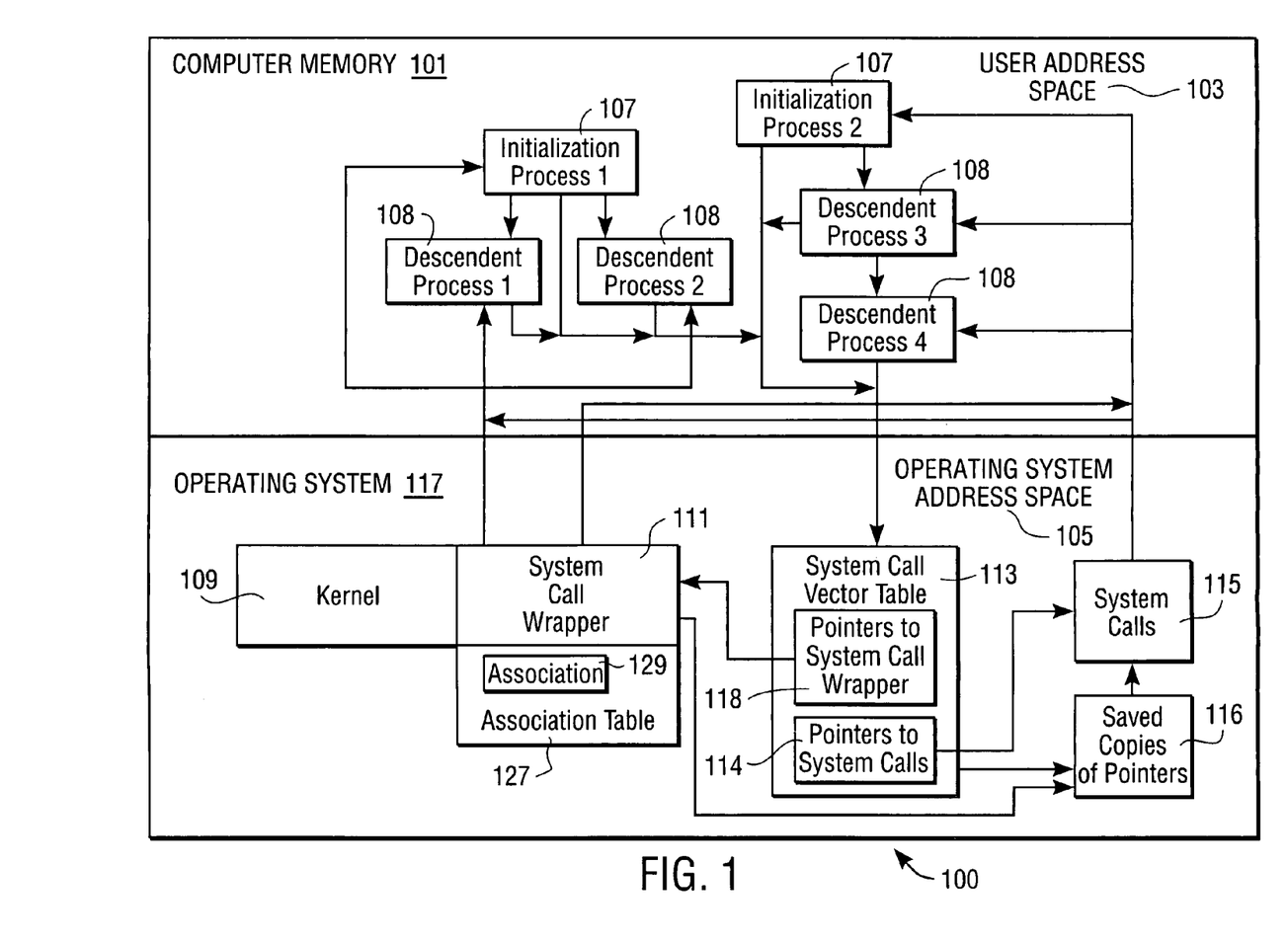
FIG. 1 is a block diagram providing a high level overview of a system for associating identifiers with virtual processes, according to one embodiment of the present invention.

FIG. 1 illustrates a high level overview of a system 100 for associating identifiers with virtual processes according to one embodiment of the present invention. A computer memory 101 includes user address space 103 and operating system address space 105. Multiple initialization processes 107 execute in user address space 103. Although FIG. 1 illustrates only two initialization processes 107 executing in user address space 103, it is to be understood that within a given computer memory 101, more than two initialization processes 107 can execute simultaneously.

Also executing in user address space are descendent processes 108, originating from the initialization processes 107. A descendent process 108 is a child process of an initialization process 107, or a child process thereof, extended to any number of generations of subsequent child processes. Although FIG. 1 illustrates only two descendent processes 108 for each initialization process 107, it is to be understood that within a given computer memory 101, fewer or more than two descendent processes 108 per initialization process 107 can execute simultaneously.

Preferably, a data structure for storing associations 129 between executing processes (initialization processes 107 or descendent processes 108) and virtual processes is inserted into the operating system 117. In one embodiment, the data structure is a mapping table 127, but in other embodiments other data structures are utilized, for example a linked list. In one embodiment, the mapping table 127 (or other data structure) is dynamically loaded into the operating system kernel 109, while the kernel 109 is active. In another embodiment, the mapping table 127 is stored in user address space 103. The maintenance and use of the mapping table 127 is discussed in detail below.

It is to be understood that a virtual process is not an actual process that executes in computer memory 101. Instead, the term "virtual process" describes a collection of associated functionality. For example, a virtual private server application is not actually a discrete process, but instead comprises a plurality of actual processes that together provide the desired functionality, thereby simulating the existence of a single server application executing on a dedicated physical host. Each actual process that performs some of the functionality of the virtual private server is a part of the virtual process. In FIG. 1 for example, initialization process 1 and descendent processes 1 and 2 (the processes descended from initialization process 1) comprise one virtual process, whereas initialization process 2 and descendent processes 3 and 4 comprise another.

In order to associate a specific identifier with each actual process that is a part of a virtual process, a separate system initialization process 107 is started for each virtual process. Normally, each process executing on a multitasking operating system is descended from a single system initialization process 107 that is started when the operating system 117 is booted. However, the present invention uses techniques described in detail below to start a separate system initialization process 107 for each virtual process. When each system initialization process 107 is started, an association 129 between the system initialization process 107 and the virtual process is stored in the mapping table 127. All additional processes that are descended from a given initialization process are thus identified with the virtual process associated with that initialization process.

In one embodiment, rather than starting a separate system initialization process 107 for each virtual process, a custom initialization process is started. In this embodiment, all processes that are a part of a specific virtual process are descended from the associated custom initialization process, and are associated with the virtual process with which the custom initialization process is associated. The exact functionality included in the custom initialization process is a design choice that can be made by a system administrator.

System calls 115 that generate child processes (for example, the UNIX® fork and clone functions) are intercepted so that the child processes can be associated with the virtual process with which the parent process is associated. A system call wrapper 111 is utilized in order to intercept system calls 115. In one embodiment, the system call wrapper 111 is dynamically loaded into the operating system kernel 109, while the kernel 109 is active. In another embodiment, the system call wrapper is loaded in user address space 103. The system call wrapper 111 is preferably in the form of object code, the functional features of which are described in detail below.

Pointers 114 to system calls 115 are located in an operating system call vector table 113. It is to be understood that the term "system call vector table" as used herein denotes an area in operating system address space 105 in which there are stored the addresses of system calls. In the UNIX® operating system, this part of the operating system is called the "system call vector table," and that term is used in this specification. Other operating systems employ different terminology to denote the same system component. A system call vector table by any other name is still within the scope of the present invention.

A copy 116 is made of a pointer 114 to each system call 115 to be intercepted. These copies 116 of pointers 114 are preferably stored in operating system address space 105, but in an alternative embodiment are stored in user address space 103. Once the copies 116 have been made and saved, the pointers 114 in the system call vector table 113 to the system calls 115 to be intercepted are replaced with pointers 118 to the system call wrapper 111, such that when a system call 115 to be intercepted is made, the system call wrapper 111 executes instead. In one embodiment, this copying, storing, and replacing of pointers is performed by the system call wrapper 111. In other embodiments, copying, storing, and replacing of pointers is performed by a pointer management module executing in either operating system address space 105 or user address space 103 as desired. The pointer management module can either be a stand alone program, or a component of a larger application program as desired.

Executing alternative code when a system call 115 is made comprises intercepting the system call 115. The steps of inserting a system call wrapper 111 into the operating system 117, making a copy 116 of an operating system pointer 114 to a system call 115, and replacing the operating system pointer 114 with a pointer 118 to the system call wrapper 111 facilitate interception of a system call 115. When a system call 115 to be intercepted is made, the operating system 117 uses the pointer 118 in the system call vector table 113 to the system call wrapper 111 to execute the system call wrapper 111.

It is to be understood that only system calls 115 that create child processes need be intercepted, and thus only pointers 114 to system calls 115 to be intercepted are replaced with pointers 118 to the system call wrapper 111. Pointers 114 to system calls 115 which are not to be intercepted are not replaced. Thus, when a non-intercepted system call 115 is made, the system call 115 executes, not the system call wrapper 111.

The various initialization processes 107 and descendent processes 108 execute in user address space 103 under control of the operating system 117, and make system calls 115. When a process makes a system call 115 that creates a child process, the system call wrapper 111 reads the mapping table 127, and determines whether the process that made the system call (the parent of the child process being created) is associated with a virtual process. If so, the system call wrapper 111 uses the saved copy of the pointer 116 to execute the system call 115, allowing the creation of the child process. The system call wrapper 111 updates the mapping table 127, storing an association 129 between the newly created child process and the virtual process with which the process that made the system call is associated. Thus, all descendent processes 108 are associated with the virtual process with which their parent process is associated.

II. Starting Initialization Processes by a Manager Program

Figure 2:
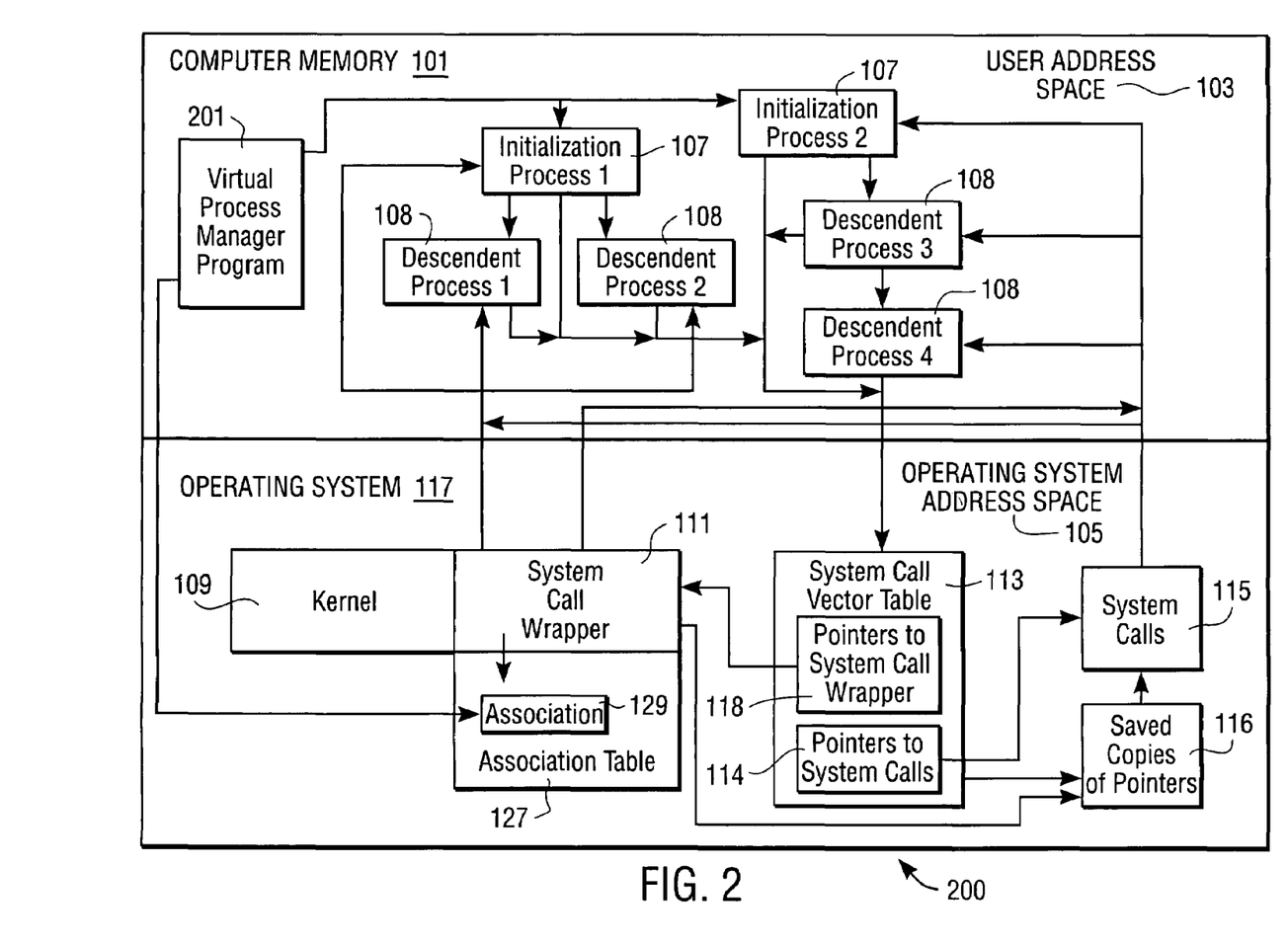
FIG. 2 is a block diagram illustrating a system utilizing a virtual process manager program, according to one embodiment of the present invention.

FIG. 2 illustrates one embodiment of a system 200 for associating identifiers with virtual processes. In the embodiment illustrated by FIG. 2, the initialization processes 107 are started by a virtual process manager program 201 executing in user address space 103.

The virtual process manager program 201 modifies the operating system 117 of the computer to include the mapping table 127. Preferably, the manager program 201 loads the mapping table 127 into the kernel 109 of the operating system 117 while the kernel is active.

For each virtual process, the manager program 201 starts an initialization process 107 from which all other processes that are part of the virtual process will originate as descendent processes 108. Each time the manager program 201 starts an initialization process 107 for a virtual process, the manager program 201 stores, in the mapping table 127, an association 129 between the initialization process 107 and the appropriate virtual process. Subsequently, all additional processes that are part of the virtual process will be originated from the initialization process, and thus associated with the appropriate virtual process.

For example, suppose that the manager program 201 starts a first virtual private server. To do so, the manager process 107 starts an initialization process 107 for the virtual private server, storing an association 129 between the initialization process 107, and a virtual process identifier for the virtual private server. Additional processes that are part of the virtual private server originate from the initialization process 107, and are associated with the virtual process identifier of the virtual private server. The manager process 201 can proceed to start a second virtual private server by starting a separate initialization process 107, and associating the second initialization process 107 with a separate virtual process identifier for the second virtual private server. Consequently, all of the processes associated with the second virtual private server will be associated with the appropriate virtual process identifier. In this manner, multiple virtual processes on the same physical computer are each associated with unique identifiers.

III. Starting Initialization Processes by a Loader Program

Figure 3:
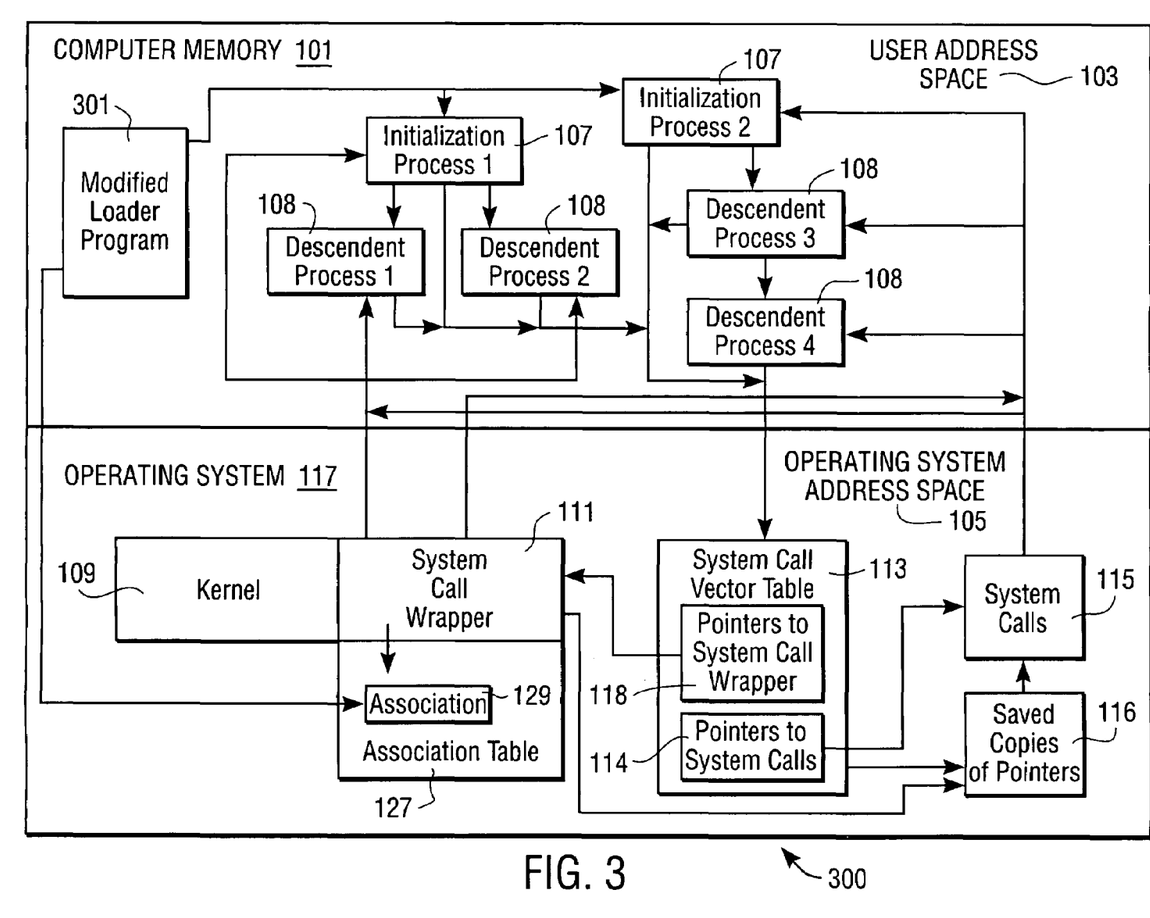
FIG. 3 is a block diagram illustrating a system utilizing a modified loader program, according to another embodiment of the present invention.

FIG. 3 illustrates another embodiment of a system 300 for associating identifiers with virtual processes. In the embodiment illustrated by FIG. 3, initialization processes 107 are not started by a manager program 201, but instead are loaded by a modified loader program 301.

A loader program is an operating system utility that is used to execute computer programs that are stored on static media. Typically, a loader program loads an executable image from static media into user address space 103 of computer memory 101, and then initiates execution of the loaded image by transferring execution to the first instruction thereof.

Like a standard loader program, the modified loader 301 loads executable images (in this case, initialization processes 107) from static media into user address space 103. Additionally, the modified loader program 301 stores, in the mapping table 127, an association 129 between the initialization process 107 being loaded and the appropriate virtual process. Thus, for each virtual process, an initialization process 107 is loaded by the modified loader program, and an association between the initialization process 107 and the virtual process is stored in the mapping table 127. Subsequently, additional processes that are part of the virtual process originate from the associated initialization process 107, and are thus associated with the virtual process as described above.

In another embodiment, the modified loader program 301 loads all processes that are part of each virtual process. In that embodiment, whenever the modified loader program 301 loads a process, the modified loader program 301 also stores, in the mapping table, an association 129 between the loaded process and the appropriate virtual process.

As will be understood by those familiar with the art, the invention may be embodied in other specific forms without departing from the spirit or essential characteristics thereof. Likewise, the particular naming of the modules, features, attributes or any other aspect is not mandatory or significant, and the mechanisms that implement the invention or its features may have different names or formats. Accordingly, the disclosure of the present invention is intended to be illustrative, but not limiting, of the scope of the invention, which is set forth in the following claims.

What is claimed is:

1. A method in a computer operating system for associating an identifier with a plurality of processes, the method comprising:
   starting a first process;
   associating the first process with the identifier;
   creating, from the first process, a second process;
   associating the second process with the identifier;
   associating a third process with the identifier, wherein the third process is not a descendant of the first process;
   creating, from the third process, a fourth process; and
   associating the fourth process with the identifier.

2. The method of claim 1 wherein the plurality of processes together provide the functionality of a dedicated server application program.

3. The method of claim 1 wherein the first process comprises a system initialization process.

4. The method of claim 1 wherein associating the first process with the identifier comprises storing an entry in a data structure, the entry comprising the identifier and a process identification number of the first process.

5. The method of claim 1 further comprising intercepting a system call, made by the first process, that creates a process.

6. The method of claim 5 wherein intercepting the system call comprises replacing a first pointer, which points to object code of the system call, with a second pointer, which points to different object code, such that making the system call causes the different object code to execute.

7. The method of claim 6 further comprising inserting the different object code into the operating system.

8. The method of claim 7 wherein inserting the different object code into the operating system comprises loading a module into a running operating system kernel, the module comprising the different object code.

9. The method of claim 1 further comprising:
  loading, by a modified loader program, the first process into computer memory;
  starting, by the modified loader program, the first process; and
  storing, by the modified loader program, an entry in a data structure in computer memory, the entry comprising the identifier and a process identification number of the first process.

10. The method of claim 1 further comprising:
  starting, by a virtual process manager program, the first process; and
  storing, by the manager program, an entry in a data structure in computer memory, the entry comprising the identifier and a process identification number of the first process.

11. A computer-readable medium storing a computer program product for using a computer operating system to associate an identifier with a plurality of processes, the computer program product comprising:
  program code for starting a first process;
  program code for associating the first process with the identifier;
  program code for creating, from the first process, a second process;
  program code for associating the second process with the identifier;
  program code for associating a third process with the identifier, wherein the third process is not a descendant of the first process;
  program code for creating, from the third process, a fourth process; and
  program code for associating the fourth process with the identifier.

12. The computer-readable medium of claim 11 wherein the computer program product further comprises program code for storing an entry in a data structure, the entry comprising the identifier and a process identification number of the first process.

13. The computer-readable medium of claim 11 wherein the computer program product further comprises:
  program code for intercepting a system call that creates a process; and
  program code for associating the process being created with the identifier of a process that made the system call.

14. The computer-readable medium of claim 11 wherein the computer program product further comprises:
  program code comprising instructions to associate the process being created with the identifier of the process that made the system call; and
  program code for replacing a pointer to the system call with a pointer to the instructions to associate, such that making the system call causes the instructions to associate to execute.

15. The computer-readable medium of claim 14 wherein the computer program product further comprises program code for storing the instructions to associate in the operating system by loading a module into a running operating system kernel, the module comprising the instructions to associate.

16. The computer-readable medium of claim 11 wherein the computer program product further comprises:
  program code for starting the first process; and
  program code for storing an entry in a data structure in computer memory, the entry comprising the identifier and a process identification number of the first process.

17. The computer-readable medium of claim 16 wherein the computer program product further comprises program code for loading the first process into computer memory.

18. A computer operating system for associating an identifier with a plurality of processes, the computer operating system comprising:
  an initiation module, for starting a first process and a third process, wherein the third process is not a descendant of the first process;
  a creation module, coupled to the initiation module, for creating, from the first process, a second process, and for creating, from the third process, a fourth process; and
  an association module, coupled to the creation module, for associating the first process with the identifier, and for associating the second process with the identifier, and for associating the third process with the identifer, and for associating the fourth process with the identifier.

19. The system of claim 18 further comprising a storage module, coupled to the association module, for storing an entry in a data structure in computer memory, the entry comprising the identifier and a process identification number of the first process.

20. The system of claim 18 further comprising an interception module, coupled to the association module, for intercepting a system call that creates a process; and wherein the association module is further for associating the process being created with the identifier of a process that made the system call.

21. The system of claim 20 further comprising a storage module, coupled to the interception module, for storing object code comprising instructions to associate the process being created with the identifier of the process that made the system call; and wherein the interception module is further for replacing a pointer to the system call with a pointer to the stored object code, such that making the system call causes the object code to execute.

22. The system of claim 21 further comprising an insertion module, coupled to the storage module, for inserting the instructions to associate in the operating system by loading a module into a running operating system kernel.

23. A method in a computer operating system for associating an identifier with a plurality of processes, the method comprising:
  executing a system initialization process;
  associating the system initialization process with the identifier;
  associating a second process, created from the system initialization process, with the identifier;
  associating a third process with the identifier, wherein the third process is not a descendant of the system initialization process;
  creating, from the third process, a fourth process; and
  associating the fourth process with the identifier.

24. A method in a computer operating system for associating an identifier with a plurality of processes, the method comprising:
  loading, by a modified loader program, a first process into computer memory; and
  storing, by the modified loader program, an entry in a data structure in computer memory, the entry comprising the identifier and a process identification number of the loaded process;

storing, by the modified loader program, an entry in a data structure in computer memory, the entry comprising the identifier and a process identification number of a second process, wherein the second process was created from the first process;

storing, by the modified loader program, an entry in a data structure in computer memory, the entry comprising the identifier and a process identification number of a third process, wherein the third process is not a descendant of the first process;

storing, by the modified loader program, an entry in a data structure in computer memory, the entry comprising the identifier and a process identification number of a fourth process, wherein the fourth process was created from the third process.

25. A method in a computer operating system for associating an identifier with a plurality of processes, the method comprising:

associating a first process with the identifier;

associating a second process with the identifier, wherein the second process is not a descendant of the first process;

creating, from the second process, a third process; and associating the third process with the identifier.

* * * * *